United States Patent
Tiwet et al.

(10) Patent No.: US 7,255,322 B1
(45) Date of Patent: Aug. 14, 2007

(54) PINCH VALVE SYSTEM WITH EXTENDED LIFE

(76) Inventors: John Tiwet, 4463 W. Lawn Ave., Waukegan, IL (US) 60085; Rebecca Tiwet, 4463 W. Lawn Ave., Waukegan, IL (US) 60085

( * ) Notice: Subject to any disclaimer, the term of this patent is extended or adjusted under 35 U.S.C. 154(b) by 0 days.

(21) Appl. No.: 11/408,402

(22) Filed: Apr. 21, 2006

(51) Int. Cl.
*F16K 7/04* (2006.01)

(52) U.S. Cl. .............................................. 251/7; 251/4
(58) Field of Classification Search .................... 251/4, 251/7

See application file for complete search history.

(56) References Cited

U.S. PATENT DOCUMENTS

| | | | | |
|---|---|---|---|---|
| 177,476 | A | * | 5/1876 | Curtis et al. ................. 172/691 |
| 5,207,409 | A | * | 5/1993 | Riikonen ......................... 251/7 |
| 5,351,932 | A | * | 10/1994 | von Herrmann ................ 251/4 |
| 6,102,361 | A | * | 8/2000 | Riikonen ......................... 251/5 |
| 6,394,411 | B1 | * | 5/2002 | Hafner et al. ................... 251/7 |

* cited by examiner

*Primary Examiner*—Eric Keasel
*Assistant Examiner*—John K. Fristoe, Jr.

(57) ABSTRACT

There is provided a pinch valve system for controlling a fluid flow in a fluid flow path. The pinch valve system has an elastic sleeve member having a pair of outwardly extending elliptical folds on the circumference. The sleeve member is novel because the elliptical folds provide additional axial lengths that match the circumferential extension of the sleeve member when the sleeve member is in a pinched condition, thereby allowing the sleeve member always to be in a stress-free state. The sleeve member is novel because the inner surface is coated with a fluorocarbon material having superior chemical inertness and high operating temperature, thereby providing the elastic sleeve member with a long service life.

6 Claims, 5 Drawing Sheets

PINCH VALVE SYSTEM WITH EXTENDED LIFE

CROSS-REFERENCE TO RELATED APPLICATIONS

Not Applicable

STATEMENT REGARDING FEDERALLY SPONSORED RESEARCH/DEVELOPMENT

The present invention does not involve any form of federally sponsored research or development.

BACKGROUND OF THE INVENTION

This invention directs itself to fluid control valves, and more particularly to pinch valve systems for controlling fluid flow in a fluid flow path.

Various types of control valves have been developed for use in plumbing, drainage and other fluid flow applications and systems. It is known that pinch valves systems are particularly suited for controlling fluid flow in vacuum-line systems.

In pinch valve systems, a critical component is the tubular elastic sleeve member that is pinched to occlude the fluid flow. The design of the elastic sleeve member is plagued with a plurality of service problems.

In many prior art systems, when the elastic sleeve member is pinched, the sleeve member is stretched and is subjected to undue stresses. Over repeated use, the stresses can result in fatigue of the elastic material, and eventually lead to a tear in the elastic sleeve member, thereby rendering the pinch valve system useless.

Moreover, particularly in vacuum-line systems, the elastic sleeve member is susceptible to exposure to boiling fluids. It is known to the art that the temperature at which a fluid boils decreases as the surrounding pressure decreases and vice-versa. In vacuum-line systems, the pressure applied to the fluid is below atmospheric pressure and the fluid can experience boiling conditions at significantly lower temperatures. Hence, when a pinch valve system is opened in the presence of warm fluids that were previously below boiling point, the sudden drop in pressure applied to the fluid can cause the fluid to boil almost instantly. Over repeated use, the vigorous boiling actions of the fluids can cause surface vitrification and material hardening of the sleeve member. The surface vitrification, characterized by tiny pits and holes, and hardening of the material become points of weakness from which a tear can propagate, thereby reducing the service life of the sleeve member.

Additionally, fluid flows in plumbing and drainage systems can contain caustic chemicals, oils, fats and the like. While these chemicals, oils and fats can have deleterious effects on the elastic sleeve member even at ambient conditions, the deleterious effects are further exacerbated when the fluids experience boiling conditions.

Finally, fluid flow in plumbing or drainage systems often contains solids such as refuse from food preparations, coffee grounds and the like. In vacuum-line systems, the fluid flow travels at high speeds and the impact of these solids on the elastic sleeve member can cause damage to the sleeve member.

It is known to the art that fluorocarbon materials such as polytetrafluoroethylene, polyvinylidene fluoride, polytrifluorochloroethylene and the like provide excellent chemical inertness, high service temperature, high strength and durability. A coating of a fluorocarbon material that is adapted with good adhesion to the underlying substrate material protects the substrate material from aforementioned weaknesses, thereby significantly increasing the service life of the substrate material. Likewise, an elastic sleeve member coated with a fluorocarbon material will benefit from the chemical inertness, high service temperature, high strength and durability of the fluorocarbon, resulting in a longer service life for the sleeve member.

Polytetrafluoroethylene is commercially sold by E.I. DuPont Nemuors and Company under its registered trademark "Teflon" and by Polymer Corporation under the registered trade name of "PolyPenco." Polyvinylidene fluoride is commercially sold by Elf Atochem North America, Inc. under its registered trademark of "Kynar." Polytrifluorochloroethylene is commercially sold by M.W. Kellogg under its registered trademark "Kel-F."

PRIOR ART

Pinch valves systems are well known in the art. The best prior art known to the Applicant include U.S. Pat. Nos. 6,394,411; 6,102,361; 5,207,409 and 5,141,108.

In U.S. Pat. No. 5,141,108 there is provided a flexible wall sleeve having a pair of outwardly directed folds, uniformly semicircular in shape to prevent over-extension of the elastic sleeve member when pinched. While the '108 patent illustrates a useful manner of reducing the stretching of the sleeve material, it does not sufficiently address the complete removal of stresses that are applied to the elastic sleeve member when it is in a stretched condition. It is known that when an elastic circular sleeve member is pinched in a direction normal to the central axis, the degree of stretch varies along the circumference of the sleeve member. In particular, it can be calculated that the stretch at the middle of the pinch line (coincident with the central axis) is 25% longer than the stretch at the extreme opposing ends along the pinch line. Hence, a fold with a uniformly semicircular cross-section does not allow for the differences in stretch, and consequently a plurality of points along the pinch line can experience either compression or tensile stresses.

While U.S. Pat. No. 6,394,411 illustrates another useful manner of a pinch valve system, it does not address the reduction in service life of the elastic sleeve member due to various aforementioned conditions of the fluid flow involving elevated temperatures, boiling conditions, the presence of solids or chemicals, oils, fats and the like.

U.S. Pat. No. 5,141,018 illustrates an effective application of a coating of a fluorocarbon material on a molded cast iron ball for providing improved sealing and chemical resistant characteristics. The '018 patent is specific to improving the characteristics of a valve ball adapted for use in a quarter turn ball valve.

BRIEF SUMMARY OF THE INVENTION

It is the object of this invention to provide an improved pinch valve system having longer service life.

It is a further object of the present invention to provide a tubular elastic sleeve member with a pair of outwardly extending contoured folds on the outer surface. The contoured folds are adapted to provide the lowest possible stresses to the elastic sleeve member at a pinched condition.

Another object of the present invention is to provide an elastic sleeve member with interior surfaces coated with fluorocarbon material such as Teflon. A superior material like Teflon provides enhanced chemical resistant, abrasion resistant and service temperature characteristics to the elastic sleeve member.

Additionally, for ease of manufacturing, the coating of fluorocarbon material may be applied to entire external surfaces of the elastic sleeve member, instead of being restricted only to the interior sidewalls.

This present invention is for a pinch valve assembly for controlling flow in a fluid flow path. The pinch valve assembly comprises of an elastic sleeve member, preferably made of rubber or like material. The elastic sleeve member is adapted to be interposed in the fluid flow path forming a flow passage therethough. The pinch valve system also comprises means for releasably pinching the elastic sleeve member, which is preferably a pair of opposing pinch brackets. The brackets are moved in parallel with each other and normal to the fluid flow path. Additionally, the elastic sleeve member has an outer surface with a pair of elliptical folds, which are preferably located on opposite sides of the pinch brackets.

DETAIL DESCRIPTION OF PREFERRED EMBODIMENTS

Figure 1:
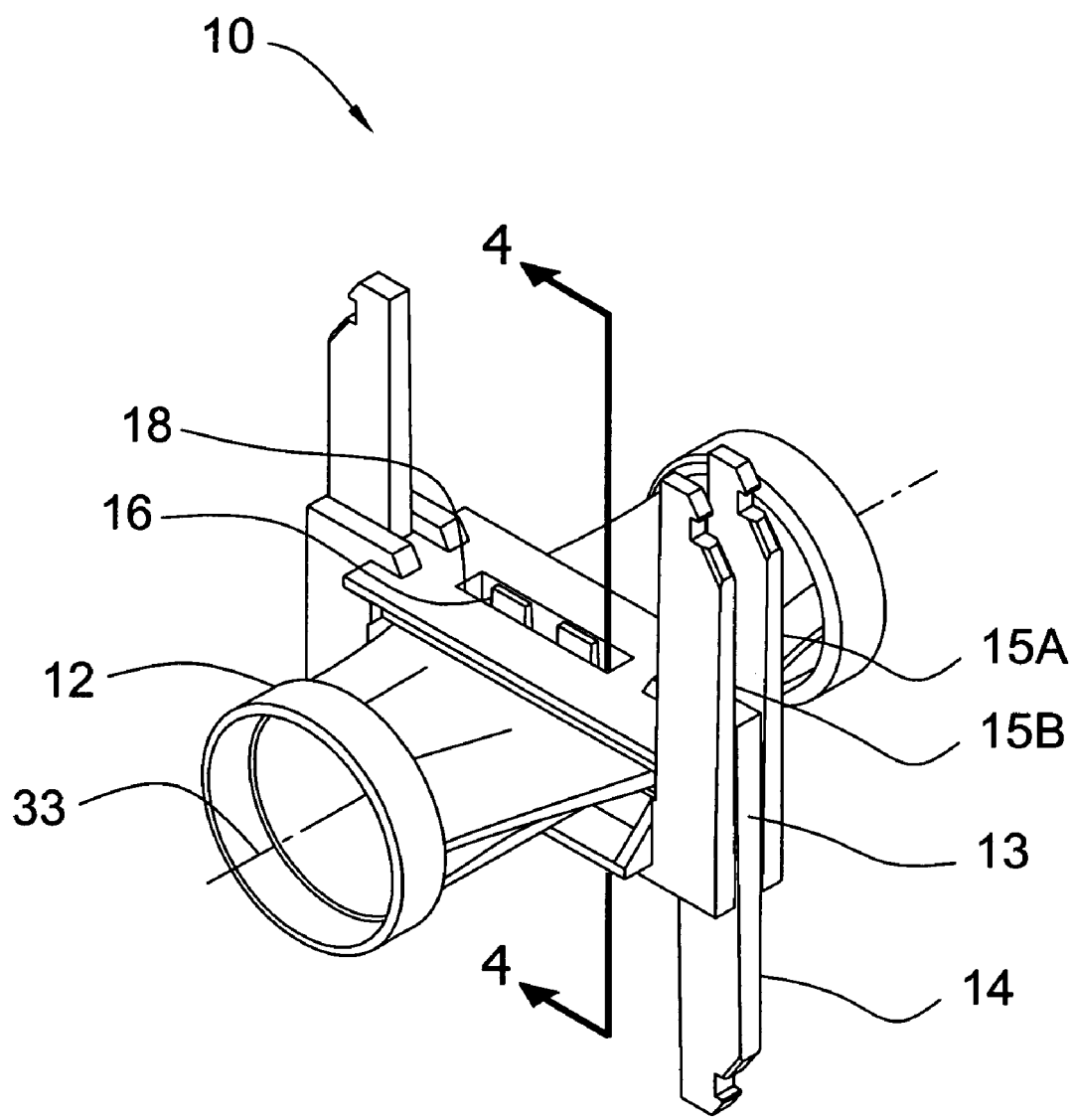
FIG. 1 is a perspective view of the present invention with the elastic sleeve member in the pinched condition.

Referring now to the drawings, FIG. 1 shows a pinch valve system, generally indicated by reference 10. The pinch valve system 10 comprises of a tubular elastic sleeve member 12 and a pair of pinch brackets 13. The elastic sleeve member is shown in the open position in FIG. 2 and in pinched position in FIG. 3. Preferably the sleeve member is circular in shape, but not necessarily limited to such shape.

Figure 2:
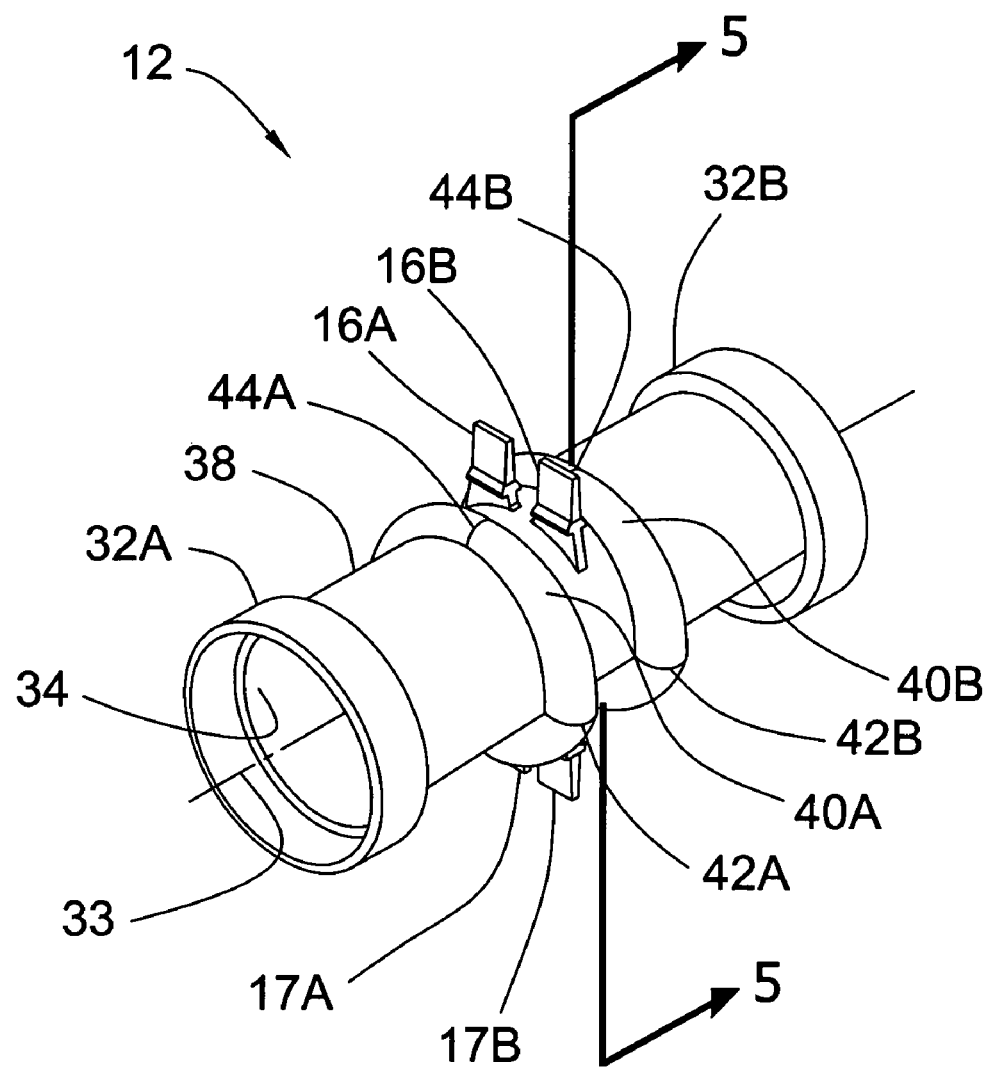
FIG. 2 is an elastic sleeve member in an open position.
Figure 4:
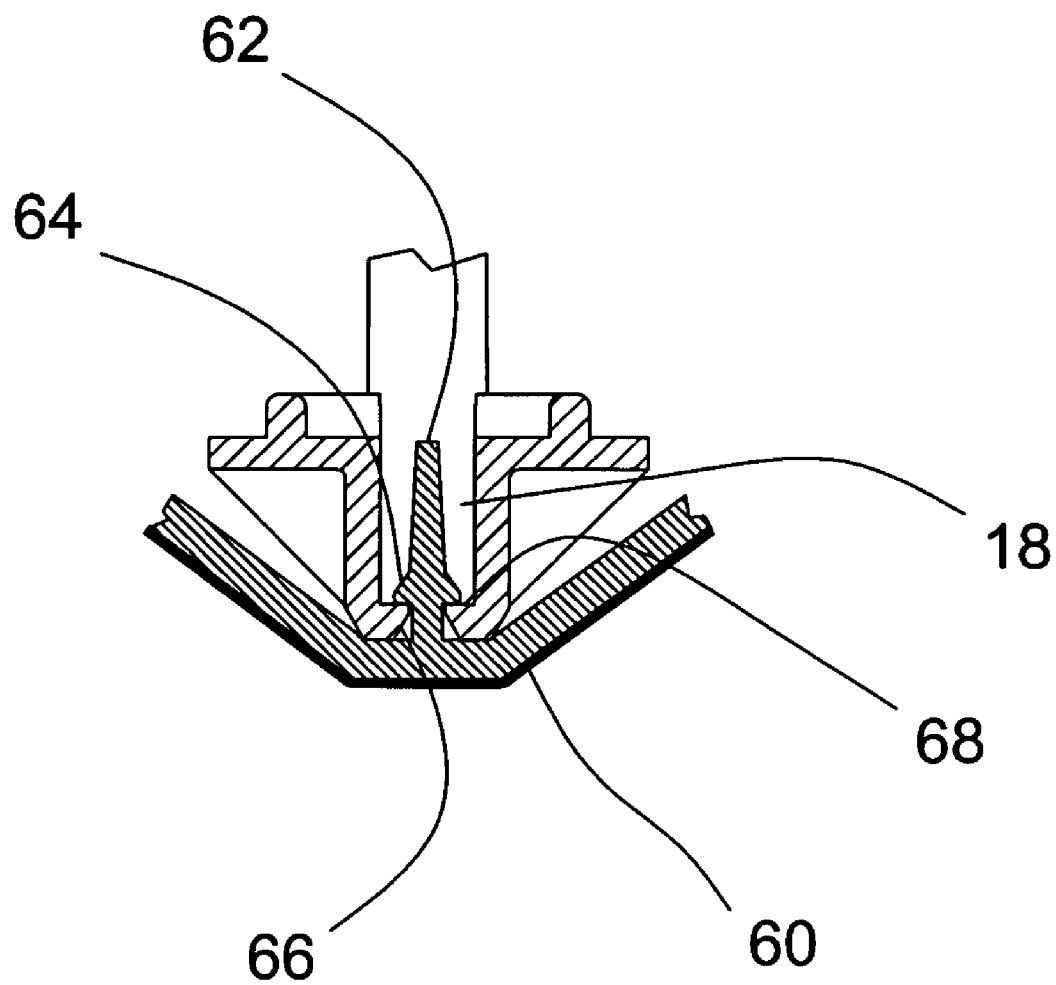
FIG. 4 is a cross-sectional view of the elastic sleeve member along line 4-4 in FIG. 1.

As shown in FIG. 2, the elastic sleeve member has a first rim 32A and a second rim 32B. The first and second rims are adapted to secure the elastic sleeve member to the fluid flow path. The means for securing the rims to the fluid flow path is known to the art. It is notable that the elastic sleeve member has a central axis 33, an outer surface 38 and an interior surface 34, which provides a flow passage therethrough. Additionally, the elastic sleeve member has a first pair of support tabs 16A and 16B and a second pair of support tabs 17A and 17B on the outer surface. Preferably, the first and second pairs of support tabs are located at midpoint of the sleeve member and on diametrically opposite sides on the sleeve member. As shown in FIG. 4, each support tab has a small end 62 and a locking flange 64.

Figure 5:
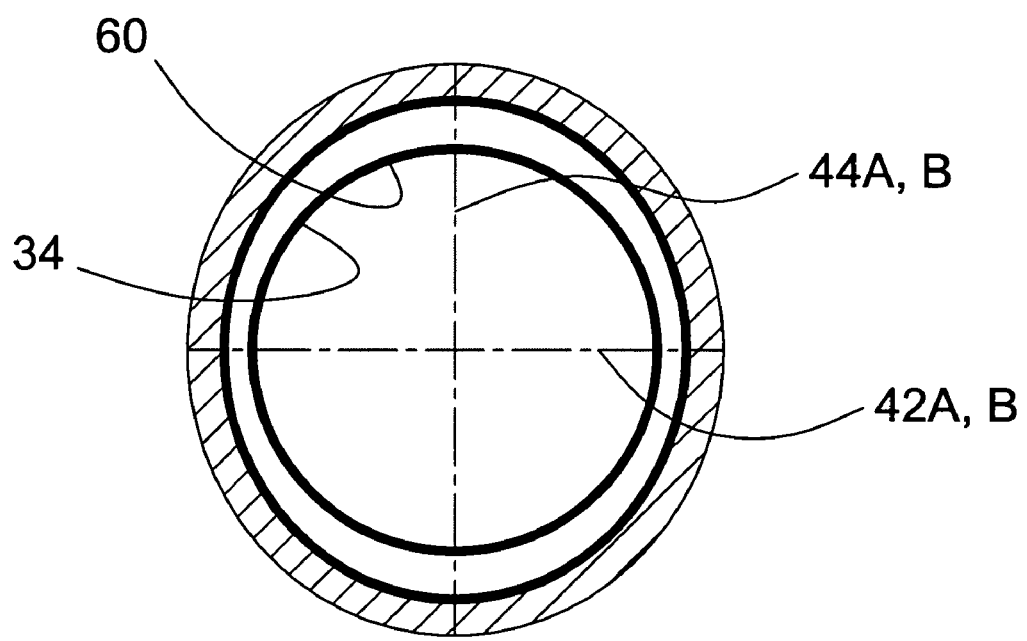
FIG. 5 is a cross-sectional view of the elastic sleeve member along line 5-5 in FIG. 2.

The elastic sleeve member has a first outwardly extending elliptical fold 40A and a second outwardly extending elliptical fold 40B on the circumference of the sleeve member. Referring to FIG. 5, the elliptical folds have a major diameter 44A and 44B and a minor diameter 42A and 42B respectively. In a cross-section taken in a plane parallel to the central axis 39, the fold is semi-circular in shape, but the radius of the semi-circular fold is at minimum at the minor diameter, and gradually increases to a maximum radius at the major diameter. The outermost points along the circumference of the folds produce the elliptical shape. Preferably the first and second elliptical folds are positioned at equidistant and on opposite sides of the pinch brackets.

Figure 3:
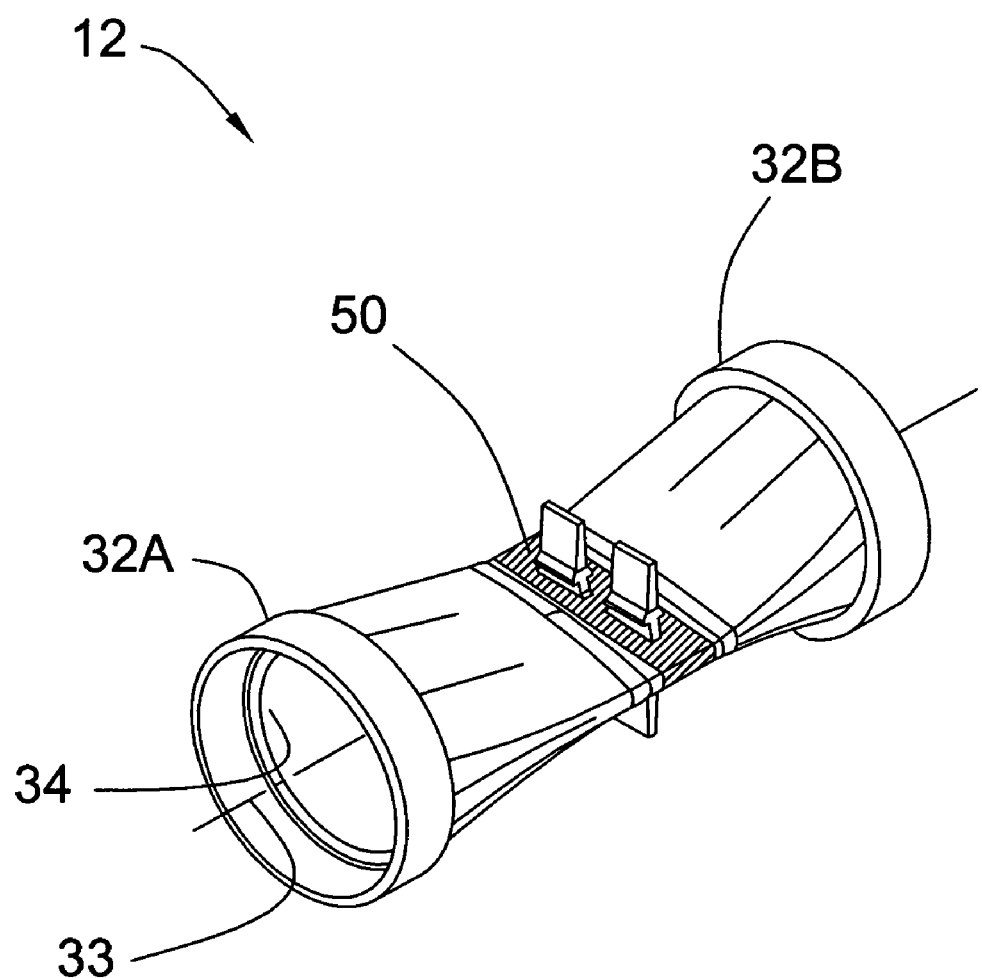
FIG. 3 is an elastic sleeve member in a pinched position.

In addition, preferably the major diameter and minor diameter are sized such that, when the sleeve member is in pinched condition, the additional axial length at the major diameter is 25% longer than the additional axial length at the minor diameter. Thus, when the sleeve member is in pinched position as shown in FIG. 3, the elliptical folds are stretched in equal amount to the extension in length of the elastic sleeve member. In this manner, the sleeve member is always in a relaxed state, and a stress-free zone, indicated by hatched area 50, is provided when the sleeve member is releasably pinched by the pinch brackets.

It is understood that the cross-sections of the folds may be contoured in different shapes that are adapted to provide varying additional lengths that match the circumferential extensions of the elastic sleeve member when it is in a stretched condition. Such embodiment does not alter the spirit of the invention.

As described above, a pinch valve system comprise of a pair of pinch brackets. Referring to FIG. 1, each pinch bracket has a single flange 14 and double flanges 15A and 15B. Preferably the pinch brackets are positioned on the circumference at the midpoint of the elastic sleeve member and normal to the central axis of the elastic sleeve. Additionally, the pinch brackets are positioned in opposite direction and rotated 180° to each other, and are adapted such that the single flange slides between the double flanges. The pinch brackets are adapted to be synchronously actuated to releasably pinch the elastic sleeve member. The means for synchronous actuation of the pinch brackets are known in the art.

Referring to FIG. 4, the pinch bracket has an undercut slot 18. At the bottom of the slot are a shoulder 68, and an aperture 66 that provides entry to the undercut slot. The small ends of the support tabs 16A, 16B, 17A and 17B facilitate easy entry through aperture 66 and into the undercut slot 18 (on pinch bracket). When the locking flange 64 is fully seated on the shoulder 68, the locking flange provides secure attachment between the sleeve member and the pinch bracket.

Referring now to FIG. 2 and FIG. 5, the elastic sleeve member has an internal surface 34. The internal wall is coated with a fluorocarbon material 60 such as Teflon, Kynar, Kel-F and the like. Preferably the fluorocarbon material is Teflon. The thickness of the hydrocarbon coating is adapted for providing protection to the underlying rubber material while simultaneously allowing free and elastic movement of the sleeve member.

As an alternate embodiment, the fluorocarbon coating is applied to the both outer surface 38 and inner surface 34 of the sleeve member. The free and unrestricted application of the coating is easier to achieve in manufacturing.

What is claimed is:

1. A pinch valve system for controlling flow in a fluid flow path comprising:

a tubular elastic sleeve member, said sleeve member having a first and a second rims, said first and second rims are adapted to secure said sleeve member to the fluid flow path, said sleeve member including at least a pair of support tabs positioned at central position between said first and second rims, said support tabs having a small end and a large end; said sleeve member having a pair of outwardly extending contoured folds on the circumference, said contoured fold providing additional axial lengths that are adapted to match the circumferential extensions of said sleeve member when in a pinched condition, said additional lengths are maximum at center of pinch line and coincident with central axis and minimum at extreme opposing ends of said pinch line;

a pair of pinch brackets, each pinch bracket comprising at one end a single flange and at the other end a double flange said brackets are positioned on the circumference of said sleeve member and equidistant from said first and second rims, said brackets are positioned in opposite direction and rotated 180° to each other, said brackets having a undercut slot and an aperture therethrough to said undercut slot; said brackets having a means for synchronous actuation to releasably pinch said sleeve member.

2. A pinch valve system as defined in claim 1 wherein said contoured folds on said sleeve member are elliptical in shape, said elliptical folds having a major and a minor diameters, the cross-section of said elliptical folds is semi-circular in shape, said semi-circular shape having a radius at maximum coincident with said major diameter and a radius at minimum coincident with said minor diameter.

3. A pinch valve system as defined in claim 1 wherein said support tabs on said sleeve member are positioned within said undercut slot, thereby providing a secure attachment between said sleeve member and said pinch bracket.

4. An elastic sleeve member defined in claims 1, 2 or 3 wherein the inner surface of said sleeve member is coated with a corrosion-resistant material with high service temperature identified as a fluorocarbon polymer.

5. An elastic sleeve member defined in claims 1, 2 or 3 wherein the inner surface of said sleeve member is coated with a corrosion-resistant material with high service temperature identified as polytetrafluoroethylene.

6. An elastic sleeve member defined in claims 1, 2 or 3 wherein the entire inner and outer surfaces of said sleeve member are coated with said corrosion-resistant material.

* * * * *